Nov. 11, 1930.  G. E. SNYDER  1,781,137
HEADLIGHT MOUNTING
Filed Sept. 28, 1928  2 Sheets-Sheet 1
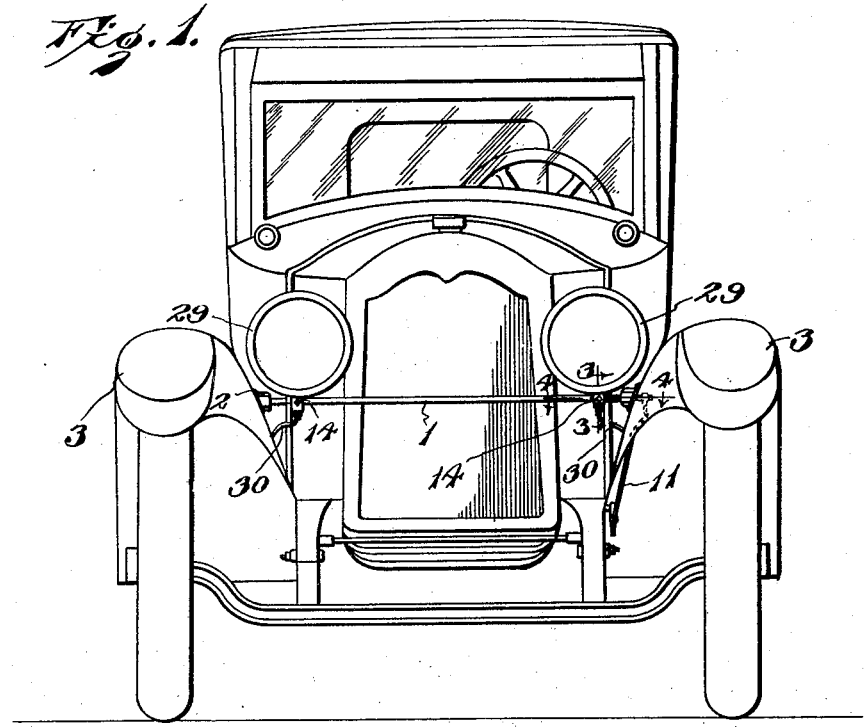
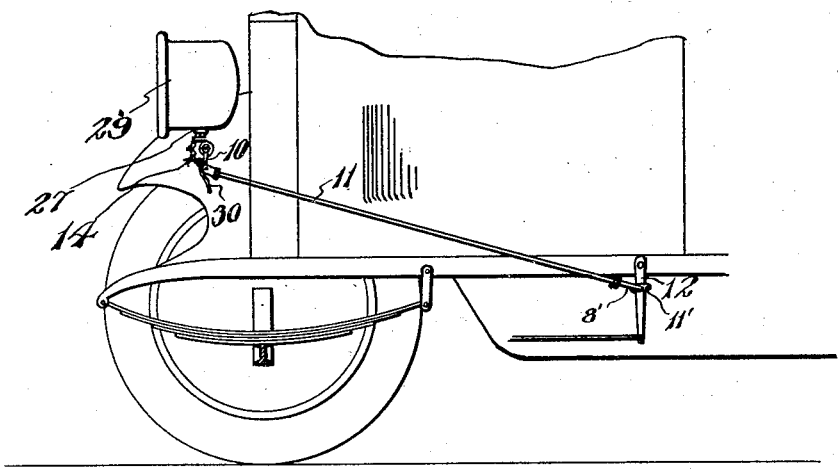
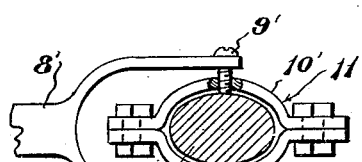
Inventor
G. E. Snyder
By Lacey & Lacey, Attorneys

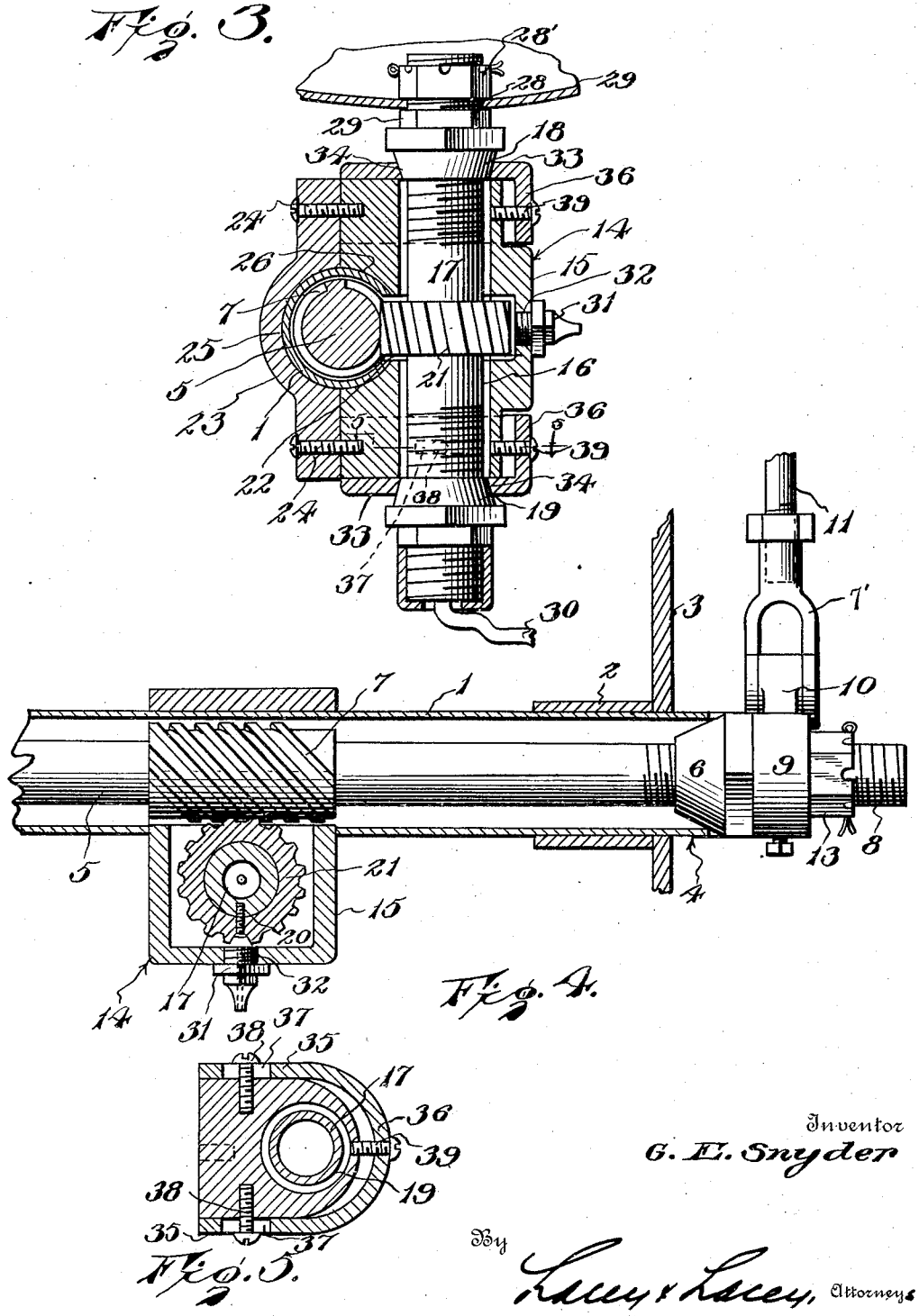

Patented Nov. 11, 1930

1,781,137

UNITED STATES PATENT OFFICE

GEORGE E. SNYDER, OF POMONA, CALIFORNIA

HEADLIGHT-MOUNTING

Application filed September 28, 1928. Serial No. 309,046.

The present invention is directed to improvements in headlight mountings for motor vehicles.

The primary object of the invention is to provide a device of this character so constructed that the headlights will be rotated so that the rays of light therefrom will follow the course of the front wheels when rounding a curve or making a turn.

Another object of the invention is to provide a device of this kind so constructed that the headlights can be conveniently adjusted to assure effective operation of the device.

Another object of the invention is to provide a device of this type wherein the headlights can be conveniently manipulated to enable the same to be used as trouble lights should the occasion arise.

In the accompanying drawing:

Figure 1 is a front view of an automobile equipped with the device.

Figure 2 is a fragmentary side view.

Figure 3 is a sectional view on line 3—3 of Figure 1.

Figure 4 is a sectional view on line 4—4 of Figure 1.

Figure 5 is a sectional view on line 5—5 of Figure 3.

Figure 6 is a fragmentary view showing the manner of connecting the links to the steering gear hanger, the latter being in section.

Referring to the drawings, 1 designates a tubular casing which is disposed transversely of the automobile radiator and has its ends supported in socket members 2 rigidly connected to the fenders 3, said casing having one of its extended ends 4 conveniently located with respect to the hanger of the steering gear.

Rotatable in the casing 1 is a rod 5 having cone bearings 6 thereon in order that they may be adjusted to take up wear, said rods having fixed thereto in spaced relation worms 7, the purpose of which will be later explained.

One end of the rod 5 is extended, as at 8, and to which is fixed a collar 9 provided with a depending arm 10 to which is pivotally connected the clevis 7' adjustably threaded on the forward end of the link 11.

The rear end of the link has similarly connected thereto a clevis 8' which is pivotally connected to the screws 9' threaded in the sections 10' of the clamp 11'. The clamp 11' can obviously be secured in vertically adjusted position upon the steering gear hanger 12 pivotally connected, as customary to one side sill of the vehicle pan, there being a lock nut 13 upon the rod 5 which is adjustable with the bearing 6. Since the link 11 is threaded in the clevis 7' and 8' adjustments are made in order that the device can be conveniently attached to cars of various sizes. Through the medium of the screws 9' the clamp 11' can be adjusted vertically upon the hanger 12.

Supports 14 are provided for placement upon the casing and consist of sections 15 having vertical bores 16 in which are rotatably mounted hollow shafts 17 which have mounted thereon upper and lower cone bearings 18 and 19 which are disposed adjacent respective ends of the bore 16, as shown in Figure 3, said bearings being threaded upon the shafts.

It will of course be understood that when it is desired to release the worm gear 21 that it will be necessary to have the front wheels straight in order that the openings 32 will coincide with the set screws 20.

Mounted upon the ends of the sections 15 of the supports 14 are plates 33 having conical seats 34 formed therein for engaging the respective bearings 18 and 19. These plates are formed with side flanges 35 which are connected at one of their ends by curved flanges 36. The side flanges are provided with slots 37 for receiving the set screws 38 which engage in the sections 15. The flanges 36 having threaded therein adjusting screws 39 which engage in the sections 15, and serve to adjust the plates 33. Since the cone casings 18 and 19 are journaled in the seats 34 it will be obvious that upon adjusting the plates 33 through the medium of the screws 39, wear can be taken up, said plates being maintained in their adjusted position by the set screws 38.

From the foregoing, it is thought that the construction, operation and many advantages of the herein described invention will be apparent to those skilled in the art, without further description, and it will be understood that various changes in the size, shape and proportion and minor details of construction, may be resorted to without departing from the spirit or sacrificing any of the advantages of the invention.

These shafts have secured thereto by set screws 20 worm gears 21 adapted to mesh with the worms 7 on the rod 5, said gears being movable in the openings 22 of the sections 15. The supports also include clamping sections 23 which are secured to the sections 15 by bolts 24, said sections being formed with semi-circular seats 25 and 26 which engage the casing 1 to maintain the support firmly clamped thereon when the bolts 24 are tightened.

The upper ends of the shafts 17 extend through the openings 28 of the headlights 29 and are secured thereon by nuts 28' and 29', current for illuminating the headlights being furnished by the wires 30 which lead through the shafts 17.

The sections 15 of the supports have nipples 31 threaded in the openings 32 and it is through these nipples that grease can be forced into the bore 16 to insure proper lubrication of the parts.

It will be observed upon reference to Figure 3 that when the wheels of the vehicle are turned rotary movement will be imparted to the rod 5 through the medium of the link 11, thereby turning the worms 7 which, being in mesh with the gears 21, will rotate the shafts 17 and thus the headlights in the direction in which the wheels are turned.

Upon reference to Figure 4, it will be observed that the openings 32 coincide with the set screws 20 in order that upon removing the nipples 31 a screw driver may be engaged with the set screws to release the worm gears 21 upon the shaft, whereupon the headlights may be turned so that their rays may be directed rearwardly for use as trouble lights.

Having thus described the invention, I claim:—

A vehicle headlight mounting including a bearing support having openings for the headlight and steering gear shafts, said openings being disposed at a right angle to one another and in communication to provide clearance for the gearing connecting the said shafts, said support having a detachable element to admit of placing the support in position or removing it from the casing of the said steering gear shaft, bearing plates at opposite ends of the support having end and side flanges, the latter contacting with the sides of the support to guide the plates and sustain lateral stresses, means between the end flanges and support for adjusting the plates, and means carried by the support and engageable through slots formed in the side flanges of the plates to secure the latter in the required adjusted position.

In testimony whereof I affix my signature.

GEORGE E. SNYDER. [L. S.]